(12) United States Patent
Courcot et al.

(10) Patent No.: US 8,940,417 B2
(45) Date of Patent: Jan. 27, 2015

(54) ENVIRONMENTAL BARRIER FOR A REFRACTORY SUBSTRATE CONTAINING SILICON

(75) Inventors: Emilie Courcot, Pessac (FR); Francis Rebillat, Merignac (FR); Caroline Louchet-Pouillerie, Arsac (FR); Henri Tawil, Le Bouscat (FR)

(73) Assignees: Herakles, Le Haillan (FR); Universite de Bordeaux 1, Talence (FR)

( * ) Notice: Subject to any disclaimer, the term of this patent is extended or adjusted under 35 U.S.C. 154(b) by 315 days.

(21) Appl. No.: 13/141,377

(22) PCT Filed: Dec. 23, 2009

(86) PCT No.: PCT/FR2009/052672
§ 371 (c)(1),
(2), (4) Date: Jun. 22, 2011

(87) PCT Pub. No.: WO2010/072978
PCT Pub. Date: Jul. 1, 2010

(65) Prior Publication Data
US 2011/0256411 A1    Oct. 20, 2011

(30) Foreign Application Priority Data
Dec. 24, 2008    (FR) ..................................... 08 59076

(51) Int. Cl.
*B63H 1/26*    (2006.01)
*B32B 9/00*    (2006.01)
(Continued)

(52) U.S. Cl.
CPC ................. *C04B 41/89* (2013.01); *C04B 35/18* (2013.01); *C04B 35/185* (2013.01);
(Continued)

(58) Field of Classification Search
CPC ...... C04B 35/01; C04B 35/185; C04B 41/52; C04B 41/522; C23C 4/105; F01D 5/288
USPC .............. 428/446, 697, 699, 701; 416/241 R, 416/241 B
See application file for complete search history.

(56) References Cited

U.S. PATENT DOCUMENTS

| 5,246,736 A | 9/1993 | Goujard et al. |
| 5,965,266 A | 10/1999 | Goujard et al. |

(Continued)

FOREIGN PATENT DOCUMENTS

FR    WO 2007116176    * 10/2007    .............. C23C 28/04

OTHER PUBLICATIONS

International Search Report as issued for PCT/FR2009/052672.
(Continued)

*Primary Examiner* — Jonathan Langman
(74) *Attorney, Agent, or Firm* — Pillsbury Winthrop Shaw Pittman, LLP

(57) ABSTRACT

In order to protect a substrate having at least a portion adjacent to a surface that is made of a refractory material containing silicon, while the substrate is in use at high temperature in a medium that is oxidizing and wet, there is formed on the surface of the substrate an environmental barrier that contains no boron and that has at least one layer that is essentially constituted by a system of oxides formed by at least one rare earth oxide, silica, and alumina, and that is capable of self-healing by maintaining the presence of at least one solid phase in a temperature range extending up to at least 1400° C. approximately.

8 Claims, 2 Drawing Sheets

(51) Int. Cl.
| | |
|---|---|
| *B32B 9/04* | (2006.01) |
| *B32B 19/00* | (2006.01) |
| *C04B 41/89* | (2006.01) |
| *C04B 35/18* | (2006.01) |
| *C04B 35/185* | (2006.01) |
| *C04B 41/00* | (2006.01) |
| *C04B 41/52* | (2006.01) |
| *C23C 4/10* | (2006.01) |
| *C23C 30/00* | (2006.01) |
| *F01D 5/28* | (2006.01) |
| *C23C 28/04* | (2006.01) |

(52) U.S. Cl.
CPC ............. *C04B 41/009* (2013.01); *C04B 41/52* (2013.01); *C23C 4/105* (2013.01); *C23C 30/00* (2013.01); *F01D 5/288* (2013.01); *C23C 28/042* (2013.01); *C23C 28/048* (2013.01); *C04B 2235/3222* (2013.01); *C04B 2235/3225* (2013.01); *C04B 2235/3427* (2013.01); *C04B 2235/3463* (2013.01); *C04B 2235/80* (2013.01); *Y02T 50/67* (2013.01); *Y02T 50/672* (2013.01)
USPC .................. 428/701; 416/241 B; 416/241 R; 428/446; 428/697; 428/699

(56) References Cited

U.S. PATENT DOCUMENTS

| | | | |
|---|---|---|---|
| 6,068,930 | A | 5/2000 | Lamouroux et al. |
| 6,291,058 | B1 | 9/2001 | Goujard et al. |
| 6,387,456 | B1 * | 5/2002 | Eaton et al. ................... 427/452 |
| 6,759,151 | B1 | 7/2004 | Lee |
| 6,787,195 | B2 | 9/2004 | Wang et al. |
| 6,866,897 | B2 | 3/2005 | Wang et al. |
| 7,968,217 | B2 * | 6/2011 | Sarrafi-Nour et al. ........ 428/702 |
| 8,168,259 | B2 * | 5/2012 | Sarrafi-Nour et al. ..... 427/376.2 |
| 2003/0138641 | A1 | 7/2003 | Fukudome et al. |
| 2006/0073361 | A1 | 4/2006 | Fukudome et al. |
| 2006/0166019 | A1 * | 7/2006 | Spitsberg et al. ............. 428/471 |
| 2009/0004427 | A1 * | 1/2009 | Sarrafi-Nour et al. .......... 428/76 |
| 2009/0169873 | A1 * | 7/2009 | Louchet-Pouillerie et al. ............................. 428/334 |

OTHER PUBLICATIONS

Tallaire, et al., "Effect of intergranular phase of $Si_3N_4$ substrate on MPCVD diamond deposition"; Surface and Coatings Technology, vol. 151-152, 2002, pp. 521-525.

Smeacetto, et al.; "Protective coatings for carbon bonded carbon fibre composites"; Ceramics International 34 (2008), pp. 1279-1301.

* cited by examiner

US 8,940,417 B2

ENVIRONMENTAL BARRIER FOR A REFRACTORY SUBSTRATE CONTAINING SILICON

CROSS REFERENCE TO RELATED APPLICATIONS

This application is the U.S. National Stage of PCT/FR2009/052672 filed Dec. 23, 2009, which in turn claims priority to French Application No. 0859076, filed Dec. 24, 2008. The contents of both applications are incorporated herein by reference in their entirety.

BACKGROUND OF THE INVENTION

For a substrate in which at least a portion adjacent to a surface is made of a refractory material containing silicon, the invention relates to protecting the substrate while it is being used at high temperature in a medium that is oxidizing and wet, by forming on the surface of the substrate an environmental barrier that does not contain boron.

The invention seeks in particular to protect refractory materials constituted by monolithic ceramics, e.g. silicon carbide SiC or silicon nitride $Si_3N_4$, and more particularly to protect refractory composite materials such as ceramic matrix composite (CMC) materials containing silicon, e.g. CMCs having a matrix that is constituted at least in part by SiC.

A particular field of application of the invention is protecting CMC parts that form hot parts of gas turbines, such as combustion chamber walls, or turbine rings, turbine nozzles, or turbine blades, for aeroengines or for industrial turbines.

For such gas turbines, the desire to improve efficiency and also to reduce polluting emissions is leading to the use of ever-higher temperatures in combustion chambers.

Proposals have thus been made to replace metal materials by CMC materials, in particular for the walls of combustion chambers or turbine rings. CMC materials are known to possess simultaneously both good mechanical properties enabling them to be used as structural elements, and the ability to conserve these properties at high temperatures. CMC materials comprise fiber reinforcement made of refractory fibers, typically carbon fibers or ceramic fibers, and densified by a ceramic matrix, e.g. a matrix of SiC.

In a corrosive environment (oxidizing atmosphere, in particular in the presence of moisture and/or a saline atmosphere), a phenomenon of surface retreat is observed with CMC materials having an SiC matrix because of volatilization of the silica ($SiO_2$) that is formed by oxidation at the surface of the CMC material.

Recommendations have been made to form an environmental barrier coating (EBC) on the surface of the CMC material. In one such known barrier for a substrate of CMC material having an SiC matrix, the anti-corrosion function is provided by a layer made of an aluminosilicate type compound of an alkaline earth metal, such as the compound $BaO_{0.75} \cdot SrO_{0.25} \cdot Al_2O_3(SiO_2)_2$ commonly referred by the abbreviation BSAS. A chemical barrier layer made of mullite or a mixed layer comprising a mixture of BSAS and mullite is interposed between the substrate and the anti-corrosion layer in order to avoid chemical interactions between the BSAS of the anti-corrosion layer and the silica that is formed by oxidation of the final SiC layer of the substrate. A silicon layer is formed on the substrate to enable the chemical barrier layer to bond thereto. Such an environmental barrier is described in particular in documents U.S. Pat. No. 6,866,897 and U.S. Pat. No. 6,787,195. The various layers are typically formed by physical deposition, in particular by thermal plasma deposition.

Satisfactory behavior for that environmental barrier has been observed at temperatures of up to 1200° C. approximately, but significant degradation is observed when the temperature exceeds 1300° C. Indeed, the bonding layer made of silicon or the surface of the matrix of the substrate material containing silicon is easily oxidized into silica in the event of cracks or defects, such as flakes, being created in the environmental barrier while the material is in use. At temperatures of about 1310° C. and above, this formation of silica leads to a chemical interaction between the BSAS of the mixed BSAS+mullite layer and/or of the final layer and the silica that is formed by oxidation, thereby leading to the environmental barrier being degraded more or less quickly and completely depending on the size of the defect therein.

Proposals are also made in an article by F. Smeacetto et al. ("Protective coatings for carbon-bonded carbon-fiber composites", Ceramics International 34 (2008), pp. 1297-1301) for a method of protecting carbon/carbon composite that consists in forming an SiC surface layer by chemical reaction with molten silicon and then depositing a silica-based glass coating containing yttrium oxide and alumina. The glass is prepared by mixing its constituent oxides while molten. The coating is formed by surface deposition of a slip containing the powder of the prepared glass, followed by heat treatment. Microcracks in the coating can be healed by raising the temperature to 1375° C. to cause the surface to be coated with molten glass. The indicated maximum operating temperature is 1400° C. Nevertheless, it should be observed that the melting of the coating at 1375° C. makes it difficult to envisage use above that temperature, in particular when the surface is exposed to a stream of gas at high speed, since it is then possible for the coating to be blown away.

Document U.S. Pat. No. 6,759,151 discloses a protective coating, in particular for a ceramic containing silicon, the coating comprising a bonding layer, at least one intermediate layer, and an outer layer. The outer layer is a rare earth silicate or is based on hafnium oxide or on zirconia.

Document US 2003/0138641 also relates to a protective coating for a ceramic containing silicon, the coating being made of stabilized zirconia with an optional intermediate layer made of rare earth silicate.

Document US 2006/0073361 describes a protective coating having an outer layer of stabilized zirconia and a stack of functional intermediate layers possibly containing rare earth silicates.

OBJECT AND SUMMARY OF THE INVENTION

In a first aspect, an object of the invention is to provide a method of protecting a substrate in which at least a portion adjacent to a surface is made of a refractory material containing silicon, by forming an environmental barrier that is capable of conserving its effectiveness in an atmosphere that is oxidizing and wet, and up to at least 1400° C., including in the presence of a gas stream at high speed.

This object is achieved by forming an environmental barrier having at least one layer that is constituted essentially by a system of oxides formed by at least one rare earth oxide, silica, and alumina, which system conserves a majority solid phase up to at least 1400° C. approximately and presents a liquid phase at a temperature equal to or greater than 1400° C. approximately, said liquid phase representing in the range 5 molar percent (mol %) to 40 mol % of the total composition of said layer, such that said layer is capable of self-healing while maintaining the presence of at least one solid phase in a temperature range extending up to at least 1400° C., approximately.

The presence of at least one solid phase at the self-healing temperature increases the ability to withstand being blown away.

The term "self-healing temperature" is used herein to mean a temperature at which a liquid phase is formed in a quantity that is sufficient to provide the self-healing function, i.e. at least 5 mol % in the composition of the self-healing layer, in order to be effective in plugging any cracks that might appear, but without exceeding 40 mol % in said composition in order to provide good resistance to being blown away.

Advantageously, an environmental barrier is formed that also includes an underlayer that is interposed between the surface of the substrate and the self-healing layer, and that remains in the solid state at the self-healing temperature. This avoids exposing the surface of the substrate directly to the liquid phase of the self-healing layer.

The underlayer may be constituted essentially by silicate of at least one rare earth or by mullite. It is thus possible to form an underlayer by essentially depositing mullite on a coating of silicon deposited on the substrate or by depositing a coating essentially comprising a silicon-mullite composition gradient starting with silicon beside the substrate and terminating with mullite at the interface with the self-healing layer.

In an implementation of the invention, the self-healing layer essentially represents a mixture of rare earth silicate $RE_2Si_2O_7$, where RE is a rare earth, and of mullite ($3Al_2O_3.2SiO_2$).

In another implementation of the invention, the self-healing layer essentially represents a mixture of rare earth aluminate $RE_4Al_2O_9$, where RE is a rare earth, and of silica $SiO_2$.

By way of example, the rare earth is at least one selected from yttrium Y, scandium Sc, and lanthanides, such as for example ytterbium Yb, dysprosium Dy, erbium Er, and lanthanum La.

The invention also provides a part comprising a substrate having at least a portion adjacent to a surface of the substrate that is made of a refractory material containing silicon, and an environmental barrier that does not contain boron and that is formed on the surface of the substrate, being capable of protecting the substrate while the part is being used in an atmosphere that is oxidizing and wet up to at least 1400° C., approximately, including in the presence of a stream of gas at high speed, the environmental barrier being of the type that is obtained by the above-defined method.

In an embodiment, the substrate is made of a composite material comprising fiber reinforcement and a matrix, the matrix including at least one phase of silicon carbide SiC adjacent to the surface of the substrate.

BRIEF DESCRIPTION OF THE DRAWINGS

The invention can be better understood on reading the following description given by way of non-limiting indication. Reference is made to the accompanying drawings, in which.

DETAILED DESCRIPTION OF EMBODIMENTS

In the following detailed description, an environmental barrier is to be formed on a substrate of CMC material containing silicon. Nevertheless, it is recalled that the invention is applicable to substrates of monolithic refractory material containing silicon, and more generally to substrates in which at least a portion adjacent to a surface is made of a refractory material (composite or monolithic) that contains silicon.

Figure 1:
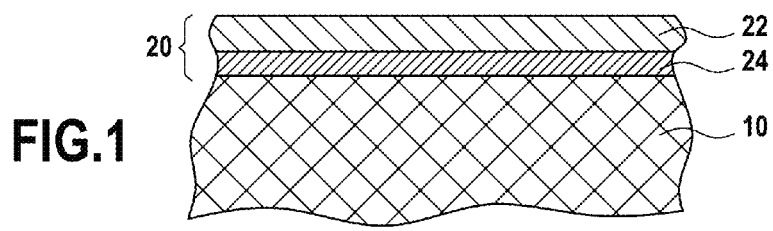
FIG. 1 is a highly diagrammatic view of a composite material part containing silicon and provided with an environmental barrier in an embodiment of the invention.

FIG. 1 is a highly diagrammatic view of a substrate 10 provided with an environmental barrier 20 constituting an embodiment of the invention.

The substrate 10 of CMC material containing silicon includes fiber reinforcement that may be constituted by carbon (C) fibers or by ceramic fibers, e.g. SiC fibers. The SiC fibers may be coated with a thin interphase layer of pyrolytic carbon (PyC), of boron nitride (BN), or of boron-doped carbon (BC, with 5 atomic percent (at %) to 20 at % of B, the balance being C). The fiber reinforcement is densified by a matrix that is constituted, throughout or at least in an outer matrix phase, by a material that contains silicon, such as a silicon compound, e.g. SiC, or an Si—B—C ternary system, for example. The term "outer matrix phase" is used to mean a matrix phase that is formed last, that is the furthest away from the fibers of the reinforcement. Under such circumstances, the matrix may be made up of a plurality of phases presenting different natures, e.g.:

a mixed C—SiC matrix (with SiC on the outside); or a sequenced matrix with alternating SiC phases and phases of lower stiffness, e.g. phases of pyrolytic carbon (PyC), of boron nitride (BN), or of boron-doped carbon (BC), with a terminal phase of the matrix being made of SiC; or a self-healing matrix with matrix phases of boron carbide ($B_4C$) or of an Si—B—C ternary system, optionally including free carbon ($B_4C+C$, Si—B—C+C), and with a terminal phase of Si—B—C or of SiC.

Such CMC materials are described in particular in the following documents: U.S. Pat. No. 5,246,736, U.S. Pat. No. 5,965,266, U.S. Pat. No. 6,291,058, and U.S. Pat. No. 6,068,930.

The environmental barrier 20 is formed over the entire outside surface of the substrate 10 or over a fraction only of said surface, e.g. when only a fraction of the surface needs to be protected. The environmental barrier 20 comprises a self-healing outer layer 22 and an inner layer or underlayer 24 interposed between the substrate 10 and the self-healing layer 22.

The self-healing layer 22 is essentially in the form of a system of oxides comprising at least: a rare earth oxide $RE_2O_3$; silica $SiO_2$; and alumina $Al_2O_3$; and is referred to below as an $RE_2O_3$—$SiO_2$—$Al_2O_3$ system. The or each rare earth is selected from Y, Sc, and lanthanides, such as for example Yb, Dy, Er, and La, and preferably from Y and Yb. In addition to such an oxide system, the self-healing layer may include, in minority manner, other constituents serving in particular to modulate the self-healing temperature or the coefficient of thermal expansion. Thus, the self-healing temperature may be increased by adding oxides such as oxides of titanium $TiO_2$, zirconium $ZrO_2$, hafnium $HfO_2$, and/or vanadium $V_2O_3$, or it may be decreased by adding oxides such as oxides of zinc ZnO, nickel NiO, manganese MnO, calcium CaO, magnesium MgO, barium BaO, strontium SrO, iron $FeO_3$ or FeO, and/or niobium $Nb_2O_5$. A modification to the coefficient of thermal expansion may be obtained by tantalum oxide $Ta_2O_5$. These other constituents represent no more than 30 mol % and preferably no more than 10 mol % in the composition of the self-healing layer.

Nevertheless, and ignoring inevitable impurities, the self-healing layer is preferably constituted by an $RE_2O_3$—$SiO_2$—$Al_2O_3$ system, and more preferably such a system with a single rare earth oxide.

The composition of the layer 22 is selected to enable it to self-heal by forming a liquid phase while maintaining a solid phase in a temperature range extending up to at least 1400° C., preferably up to at least 1450° C., and possibly going as far as 1700° C.

The composition of the $RE_2O_3$—$SiO_2$—$Al_2O_3$ system may be selected as follows.

For a desired self-healing temperature of the system, a search is made in the $RE_2O_3$—$SiO_2$—$Al_2O_3$ phase diagram for a composition that produces a phase that is liquid at said temperature in the presence of one or more solid phases, the liquid phase being in a quantity that is sufficient, preferably representing at least 5 mol %, more preferably at least 10 mol % in the composition of the layer 22, but not excessive, i.e. preferably representing no more than 40 mol % in the composition of the layer 22.

The underlayer 24 may be formed essentially of a rare earth silicate or a plurality of silicates of the same rare earth or of different rare earths. For a given rare earth RE, the silicate(s) may be in the form $RE_2SiO_5$ and/or $RE_2Si_2O_7$ and/or $RE_{4.67}(SiO_4)_3O$. The or each rare earth may be selected for example from: Y, Sc, and lanthanides, such as for example: Yb, Dy, Er, and La. When the self-healing layer 22 has an oxide of a single rare earth and the underlayer 24 comprises a silicate of a single rare earth, the rare earth of the underlayer 24 may be identical to that of the self-healing layer 22, or it may be different therefrom.

The underlayer 24 may also be formed essentially by mullite deposited on the substrate 20, either directly or else with an interposed coating of silicon formed on the substrate to favor bonding of the mullite. It is also possible to form the underlayer by a coating that essentially comprises a silicon-mullite composition gradient starting from silicon beside the substrate and terminating with mullite beside the self-healing layer 22.

The underlayer 24 may include other constituents in minority manner, e.g. one or more oxides for modulating its coefficient of thermal expansion, e.g. tantalum oxide $Ta_2O_5$. These other constituents represent no more than 30 mol %, preferably no more than 10 mol % of the composition of the underlayer 24. It is important for the underlayer 24 to remain chemically and thermally stable under the conditions of use and for it to be chemically and thermomechanically compatible with the substrate and with silica. In other words, it is desirable for the underlayer 24 to remain in the solid state at the desired temperatures for self-healing of the self-healing layer 22 so as to avoid any direct contact between the substrate 10 and the self-healing layer 22, and so as to avoid forming a liquid phase with the substrate and the silica contained in the self-healing layer 22 or coming from oxidation of the silicon of the substrate 10. It is also desirable for the coefficient of thermal expansion of the underlayer 24 to be relatively close to the coefficients of thermal expansion of the substrate 10 and of the self-healing layer 22.

Ignoring impurities, the underlayer 24 is preferably constituted by a silicate of a single rare earth.

The underlayer 24 may be formed on the substrate 10 by plasma spraying, starting from solid powders of $RE_2O_3$ and $SiO_2$ and/or powders of the compound $RE_2SiO_5$, $RE_2Si_2O$, $RE_{4.67}(SiO_4)_3O$, and possibly powders of other minority constituents.

In similar manner, the self-healing outer layer 22 may be formed on the underlayer 24 by plasma spraying, starting from solid powders of $RE_2O_3$, $SiO_2$, and $Al_2O_3$, and/or powders of compounds such as $RE_2SiO_5$, $RE_2SiO_2O_7$, $RE_{4.67}(SiO_4)_3O$, mullite ($3Al_2O_3$-$2SiO_2$), $RE_3Al_5O_{12}$, $RE_4Al_2O_9$, $REAlO_3$, and optionally powders of other minority constituents, the respective quantities of the sprayed powders being selected as a function of the desired final composition.

Other methods of depositing the underlayer 24 and the self-healing outer layer 22 can be envisaged, e.g. delivering particles in sol-gel form, applying particles in the form of a slip, deposition by electrophoresis, physical vapor deposition (PVD), or chemical vapor deposition (CVD).

The thickness of the underlayer 24 is selected to be relatively small, e.g. lying in the range 10 micrometers (μm) to 300 μm, and the thickness of the self-healing layer may also be selected to be relatively small, e.g. lying in the range 10 μm to 300 μm. The thickness may also depend on the capacity of the deposition process used for forming thin layers that are homogenous and of thickness that is substantially uniform. Thus, for small thicknesses, it may be preferred to use deposition processes of the PVD or CVD type.

The presence of a self-healing outer layer with maintenance of a solid phase makes it possible to have an environmental barrier that is effective, leaktight, and persistent at the self-healing temperatures. In the event of returning to a temperature lower than the self-healing temperature, the liquid phase crystallizes and leaktightness continues to be provided by a coating that is in the form of juxtaposed grains. In the event of cracks appearing, raising the temperature up to the self-healing temperature suffices to plug the cracks.

Example 1

An SiC/SiC composite material substrate comprising fiber reinforcement made of SiC fibers and an SiC matrix, was provided with an environmental barrier as follows:

depositing an underlayer of yttrium silicate $Y_2Si_2O_7$ from an $Y_2Si_2O_7$ powder onto the SiC/SiC substrate by plasma spraying, the underlayer having a thickness of about 200 μm; and depositing an outer layer on the underlayer by plasma spraying, starting from a mixture of powders of mullite (15 mol %) and of $Y_2Si_2O_7$ (85 mol %) giving a composition that formed a system of $Y_2O_3$ (53.61 weight percent (wt %)), $SiO_2$ (33.57 wt %), and $Al_2O_3$ (12.82 wt %), with the thickness of the outer layer being about 100 μm.

At 1400° C. and at 1450° C. the outer layer possessed a liquid phase capable of sealing cracks that appear in the environmental barrier, and having two solid phases at 1400° C. and one solid phase at 1450° C.

Figure 2:
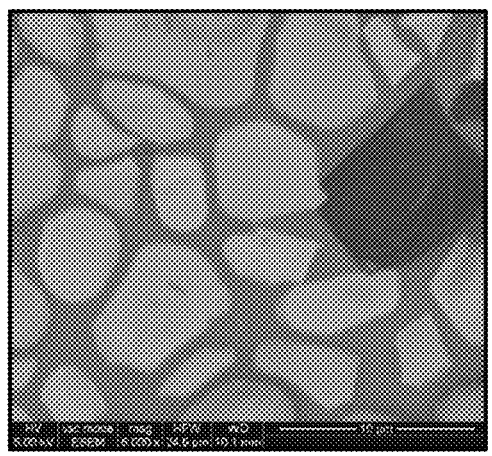
FIGS. 2 to 9 are photographs obtained by means of a scanning electron microscope showing the surface states of various environmental barriers, some of which are in accordance with the invention.
Figure 3:
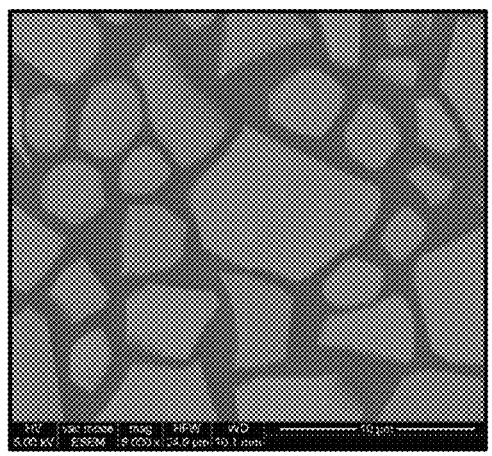

FIG. 2 shows a portion of the surface of the outer layer after its temperature had been raised for 50 hours (h) in air at 1400° C., and FIG. 3 shows a portion of the surface of the outer layer after 20 h under air at 1450° C. There can be seen solid phases formed by grains of $Y_2Si_2O_7$ (white) and of $Al_2O_3$ (black), and a liquid phase that occupies all of the space between the solid grains, thereby providing leaktightness for the environmental barrier. The liquid phase possessed the composition of the peritectic: mullite+$Y_2Si_2O_7$→$Al_2O_3$+liquid phase, the composition of the liquid phase being 12.8 at % Al, 15.75 at % Si, 8.3 at % Y, and 63.15 at % O. In the composition of the outer layer, this liquid phase represented about 10 mol % to 15 mol % at 1400° C. and about 15 mol % to 20 mol % at 1450° C.

Figure 4:
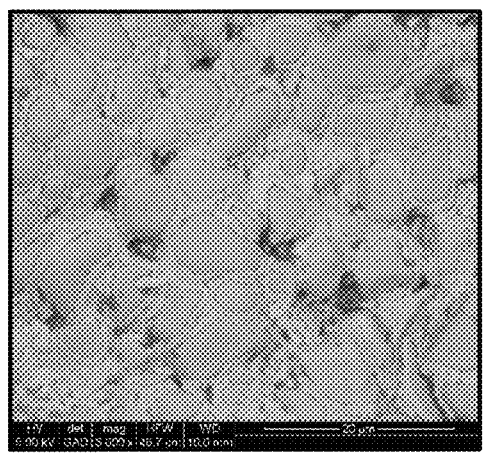

FIG. 4 shows a portion of the surface of the outer layer after 20 h at 1450° C. and then 90 h at 1200° C. The liquid phase has crystallized and the leaktightness of the coating is provided by grains being juxtaposed.

Example 2

The procedure was as in Example 1, but the outer layer was formed from a mixture of powders of mullite (41.2 mol %)

and of $Y_2Si_2O_7$ (58.8 mol %), giving a composition forming the following system: $Y_2O_3$ (35.04 wt %), $SiO_2$ (31.71 wt %), and $Al_2O_3$ (33.25 wt %).

Figure 5:
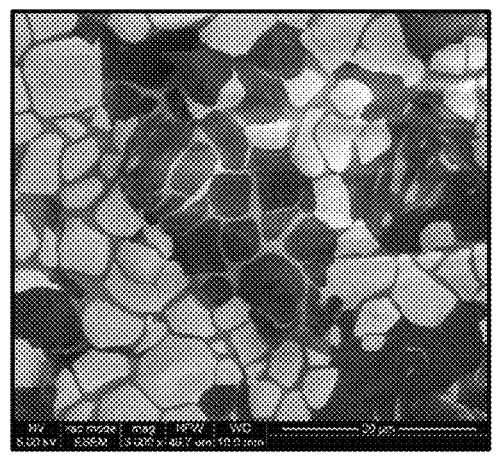

FIG. 5 shows a portion of the surface of the outer layer after 50 h under air at 1400° C. The liquid phase identical to that of Example 1 occupies all of the space between the grains of $Y_2Si_2O_7$ (white) and of mullite and of $Al_2O_3$ (black), thereby providing self-healing. In the composition of the outer layer, the liquid phase represented about 5 mol % to 8 mol %.

It should be observed that at 1450° C., the outer layer melted, with the quantity of liquid phase becoming excessive.

Example 3

The procedure was as in Example 1, but the outer layer was formed from a mixture of powders of mullite (54.4 mol %) and of $Y_2Si_2O_7$ (45.6 mol %), giving a composition forming the following system: $Y_2O_3$ (26.43 wt %), $SiO_2$ (30.85 wt %), and $Al_2O_3$ (42.72 wt %).

Figure 6:
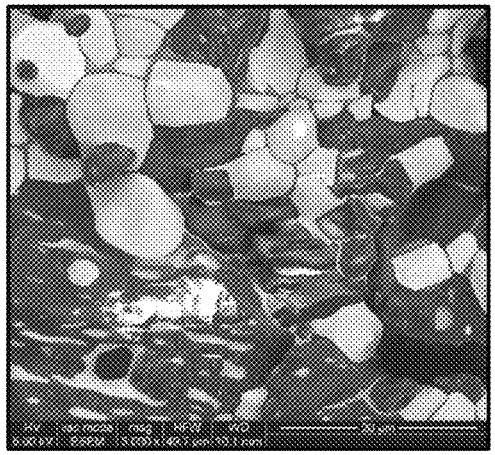

FIG. 6 shows a portion of the surface of the outer layer after 50 h in air at 1400° C. A liquid phase identical to that of Example 1 was indeed formed, but the quantity of liquid phase was insufficient, so that pores remained. Self-healing therefore could not be achieved completely. In the composition of the outer layer, the liquid phase represented significantly less than 5 mol %.

At 1450° C., the outer layer had melted, with the quantity of liquid becoming excessive.

Example 4

The procedure was as in Example 1, but the outer layer was formed from a mixture of powders of mullite (80 mol %) and of $Y_2Si_2O_7$ (20 mol %) giving a composition forming the following system: $Y_2O_3$ (11.01 wt %), $SiO_2$ (29.31 wt %), and $Al_2O_3$ (59.68 wt %).

Figure 7:
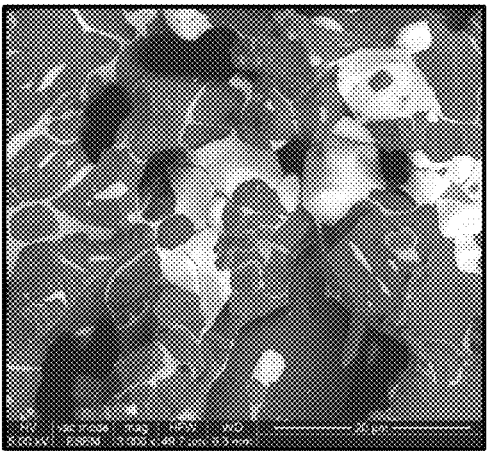

FIG. 7 shows a portion of the surface of the outer layer after 50 h in air at 1400° C. A liquid phase identical to that of Example 1 was indeed formed, however, as in Example 3, in a quantity that was insufficient to provide satisfactory healing. In the composition of the outer layer, the liquid phase represented significantly less than 5 mol %.

At 1450° C., the outer layer melted, with the quantity of liquid phase becoming excessive.

Examples 1 to 4 show that by forming the outer layer from a mixture of mullite and $Y_2Si_2O_7$, the molar percentage of mullite should preferably be less than 50%, the liquid phase representing no more than 20 mol % in the composition of the outer layer.

Example 5

The procedure was as in Example 1, but the outer layer was formed from a mixture of powders of: yttrium aluminate $Y_4Al_2O_9$ (8 mol %) and of $SiO_2$ (92 mol %), giving a composition forming the following system: $Y_2O_3$ (36.29 wt %), $SiO_2$ (55.52 wt %), and $Al_2O_3$ (8.19 wt %).

Figure 8:
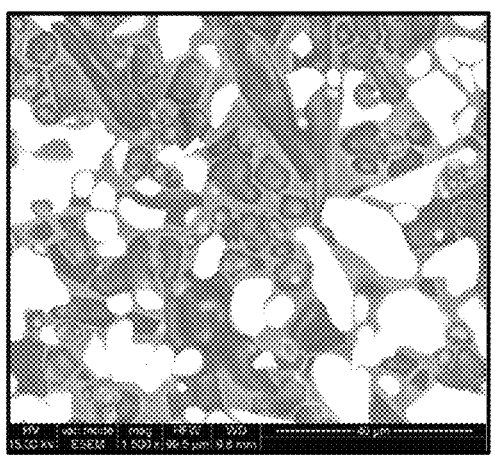

FIG. 8 shows a portion of the surface of the outer layer after 50 h in air at 1400° C. There can be seen solid phases formed by grains of $Y_2Si_2O_7$ (white) and of $SiO_2$ (black) and a liquid phase occupying all of the space between the grains and providing the sealing of the environmental barrier. By weight, the liquid phase had the following composition approximately: $Y_2O_3$ (35%), $SiO_2$ (50%), and $Al_2O_3$ (15%). In the outer layer, the liquid phase represented about 10 mol % to 15 mol %.

Example 6

The procedure was as in Example 1, but $Y_2Si_2O_7$ was replaced with ytterbium silicate $Yb_2Si_2O_7$ in the underlayer and in the outer layer, the outer layer comprising 15 mol % of mullite and 85 mol % of $Yb_2Si_2O_7$.

Figure 9:
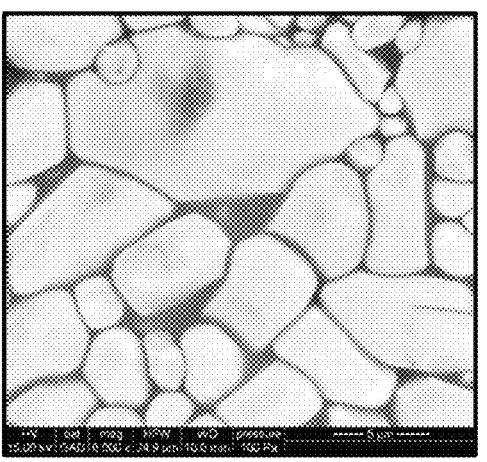

FIG. 9 shows a portion of the surface of the outer layer after 20 h in air at 1450° C., and it can be seen that a liquid phase is present that provides effective healing with the presence of solid phases formed mainly by grains of $Yb_2Si_2O_7$ and of $Al_2O_3$, and also of mullite. The liquid phase represented about 5 mol % to about 8 mol % in the outer layer and it possessed the following composition: 52.25 at % O, 13.38 at % Al, 17.84 at % Si, and 16.53 at % Yb.

The invention claimed is:

1. A part comprising:
a substrate, the substrate being a ceramic matrix composite material containing silicon, and the substrate having at least a portion that is adjacent to a surface of the substrate that is made of a refractory material containing silicon, and an environmental barrier that does not contain boron formed on the surface of the substrate and capable of protecting the substrate during use at high temperature in a medium that is oxidizing and wet,
wherein the environmental barrier has at least one layer that is constituted essentially by a system of oxides formed by at least one rare earth oxide, silica, and alumina, which system conserves a majority solid phase up to at least 1400° C. approximately and presents a liquid phase at a temperature equal to or greater than 1400° C. approximately, said liquid phase representing in the range 5 mol % to 40 mol % of the total composition of said layer, such that said layer is capable of self-healing while maintaining the presence of at least one solid phase in a temperature range extending up to at least 1400° C., approximately,
and wherein the environmental barrier further includes an underlayer interposed between the surface of the substrate and the self-healing layer, the underlayer being in contact with the substrate and being constituted essentially by silicate of at least one rare earth;
wherein the silicate of at least one rare earth is present in the underlayer in a molar fraction greater than or equal to 70%.

2. A part according to claim 1, wherein the self-healing layer essentially represents a mixture of rare earth silicate $RE_2Si_2O_7$, where RE is a rare earth, and of mullite ($3Al_2O_3 \cdot 2SiO_2$).

3. A part according to claim 1, wherein the self-healing layer essentially represents a mixture of rare earth aluminate $RE_4Al_2O_9$, where RE is a rare earth, and of silica $SiO_2$.

4. A part according to claim 1, wherein the rare earth is at least one selected from yttrium, scandium, and the lanthanides.

5. A part according claim 1, wherein the substrate is made of a composite material comprising fiber reinforcement and a matrix, the matrix including at least one phase of silicon carbide SiC adjacent to the surface of the substrate.

6. A part according to claim 1, wherein the rare earth of the underlayer is identical to the rare earth of the self-healing layer.

7. A part according to claim 1, wherein the self-healing layer is in contact with the underlayer.

8. A part according to claim 1, wherein the silicate of at least one rare earth is present in the underlayer in a molar fraction greater than or equal to 90%.

\* \* \* \* \*